United States Patent [19]

Blackman

[11] Patent Number: 4,836,403

[45] Date of Patent: Jun. 6, 1989

[54] MULTI-USE TRAY WITH ACCESSORIES

[76] Inventor: Laura M. Blackman, 420 San Saba, El Paso, Tex. 79912

[21] Appl. No.: 128,427

[22] Filed: Dec. 3, 1987

[51] Int. Cl.⁴ .............................................. A47G 29/00
[52] U.S. Cl. .................................... 220/85 H; 211/88; 211/75; 248/230
[58] Field of Search ................... 220/85 H, 18, 23.83, 220/23.86; 206/1.7, 1.8; 248/230; 211/75, 88, 89, 99, 100, 107

[56] References Cited

U.S. PATENT DOCUMENTS

| | | | |
|---|---|---|---|
| 3,239,272 | 3/1966 | Wilkins | 211/88 X |
| 3,842,981 | 10/1974 | Lambert | 220/23.83 X |
| 3,904,041 | 9/1975 | Medgebow | 211/75 X |
| 4,357,881 | 11/1982 | De Long | 211/88 X |
| 4,424,949 | 1/1984 | Kimmett | 220/18 X |
| 4,702,448 | 10/1987 | Lo Jacono et al. | 248/230 X |

Primary Examiner—Steven M. Pollard
Attorney, Agent, or Firm—James J. Brown

[57] ABSTRACT

A tray is described having provisions which permit its attachment to various objects such as table legs and vehicle window sills. The tray is further provided with accessories which hold items such as glasses, cups and ash trays.

7 Claims, 8 Drawing Sheets

MULTI-USE TRAY WITH ACCESSORIES

SUMMARY OF THE INVENTION

The present invention is directed to a tray for attachment to diverse surfaces and projections in which the flat planar surface of the tray is maintained in a horizontal position. The tray can also be provided with optional accessories to accommodate such items as food, beverages, or other articles.

BACKGROUND OF THE INVENTION

Generally, trays for holding various items have commonly had the disadvantage that they themselves have required essentially flat, planar surfaces upon which the tray or the tray's legs could firmly be seated. This requirement has naturally led to the disadvantage that trays which would otherwise be useful cannot be employed in a large number of environments which do not have the required flat surface upon which to place the tray.

Further, the usual flat tray surface, while useful for holding many items, is not always suitable for holding items which do not have flat bottom surfaces that accommodate the flat surface of the tray.

Accordingly, it would be especially useful to have a multi-purpose tray which does not require a flat surface upon which it can be rested, but rather is equipped with provisions that permit it to be attached at various angles and to different projections and surfaces. It would also be desirable to provide a tray which, in addition to the customary horizontal surface, provides for various optional accessories to accommodate items which are not conveniently rested or placed on the horizontal surface of the tray itself.

The present invention accomplishes these and other useful objectives, as will be described herein.

DETAILED DESCRIPTION OF THE INVENTION

In accordance with the present invention, a tray is provided for attachment to various surfaces and projections which comprises a flat, planar surface which is disposed horizontally and provided with at least one clip formed integrally into the tray for attachment to a vertical projection. An elongated support bracket is also pivotally attached at one of its ends to the underside of the tray surface remote from the clip and is inclined at an acute angle away from the underside of the tray surface so that it can engage a vertical surface to provide additional support to the horizontal tray. Various additional clips and support brackets are also provided so that the tray can be attached to different surfaces and projections as required.

The present invention including the various alternative embodiments which constitute a part thereof and a preferred embodiment of the present invention will however, be more fully understood by having reference to the accompanying drawings.

Figure 1:
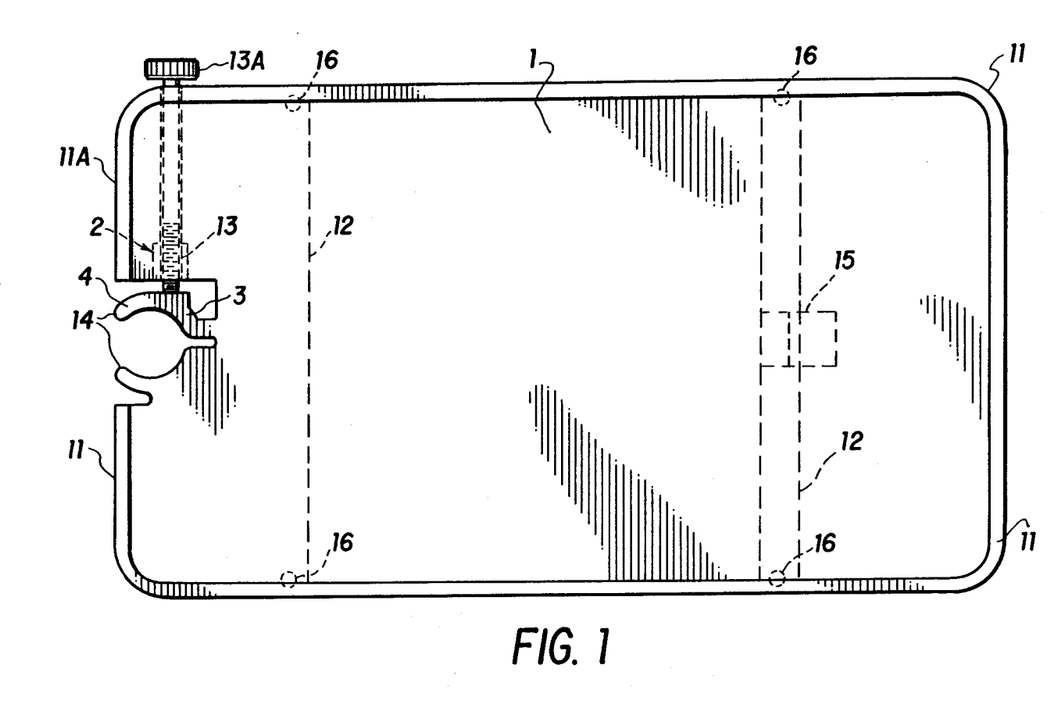
FIG. 1 is a top view of the tray of the invention.
Figure 2:
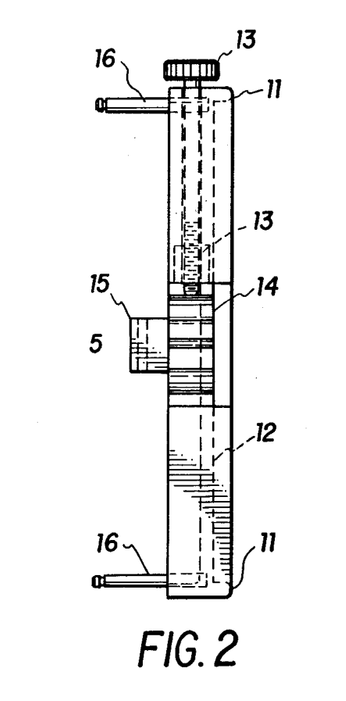
FIG. 2 is an end view of the tray of the invention.
Figure 3:
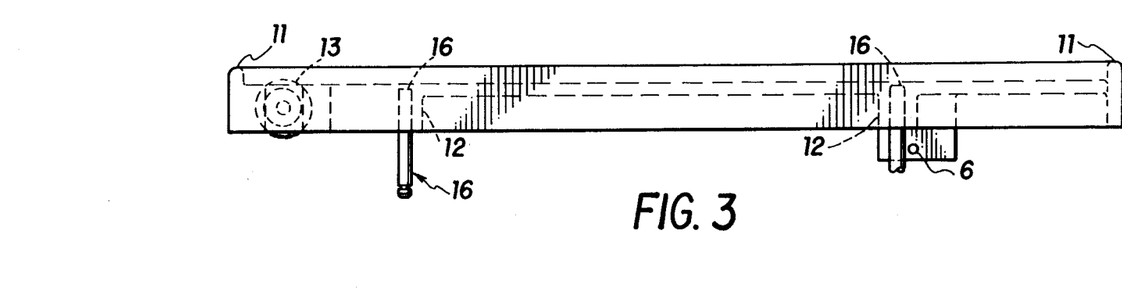
FIG. 3 is a side view of the tray of the invention.

Considering initially FIGS. 1, 2 and 3 of the drawings, a flat, planar tray 1 is shown having a raised peripheral edge 11, which fully encloses three sides of the tray, and partially encloses the fourth side. Reinforcing cross pieces 12 are provided across the underside of the tray surface. Molded integrally into the tray surface on the partially enclosed fourth side is an arcuate clip 4, having two wings or arms 14 and a flat, squared surface 3 on one of the two arms. A threaded screw 13 is inserted through the collar 2 molded onto the underside of the tray and engages the surface 3 of the arm 14 so that by screwing the threaded shaft into the collar 2, the two arms 14 are depressed together to provide a clipping action for engagement onto a vertical structure such as the leg of a chair or table. Four downwarding extending spindles 16 are provided at the periphery of the tray for attachment of optional holders. A downwardly projecting bracket 15 is provided midway along the support member 12 for attachment of a support as will be further described.

Figure 4:
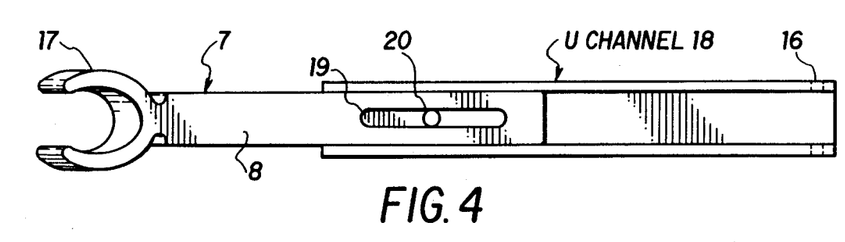
FIG. 4 is a view illustrating the underside support bracket used with the tray of the invention.
Figure 5:
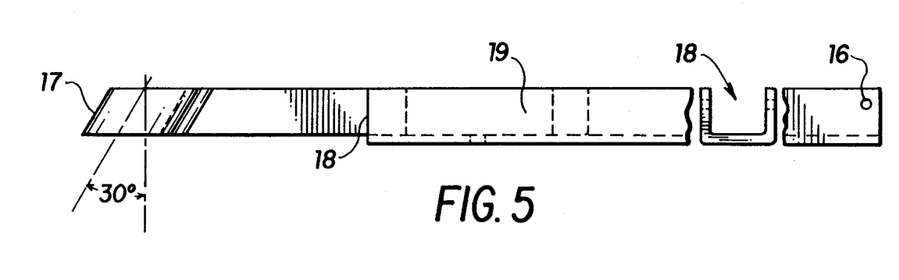
FIG. 5 is a side view showing the bracket of FIG. 4.
Figure 6:
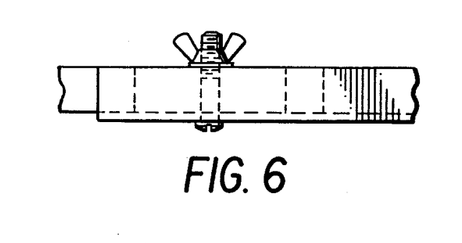
FIG. 6 is a side view of the thumb screw adjustment of the bracket of FIGS. 4 and 5.
Figure 7:
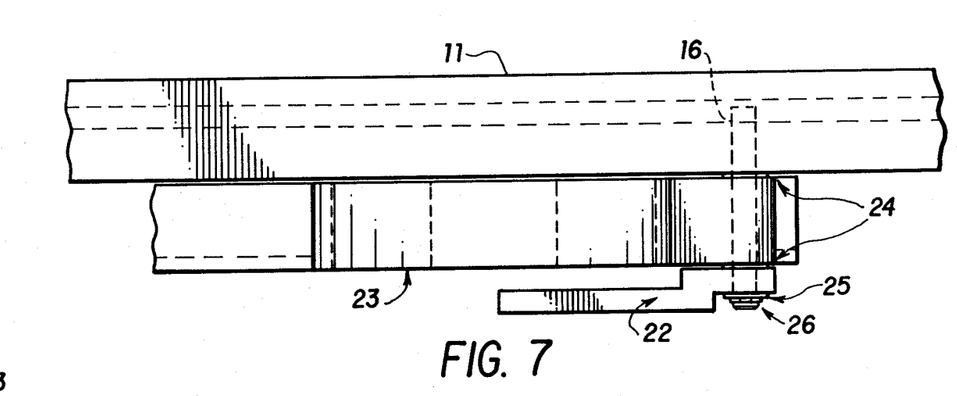
FIG. 7 illustrates attachment of a pivoting cup holder to the underside of the tray of the invention.
Figure 8:
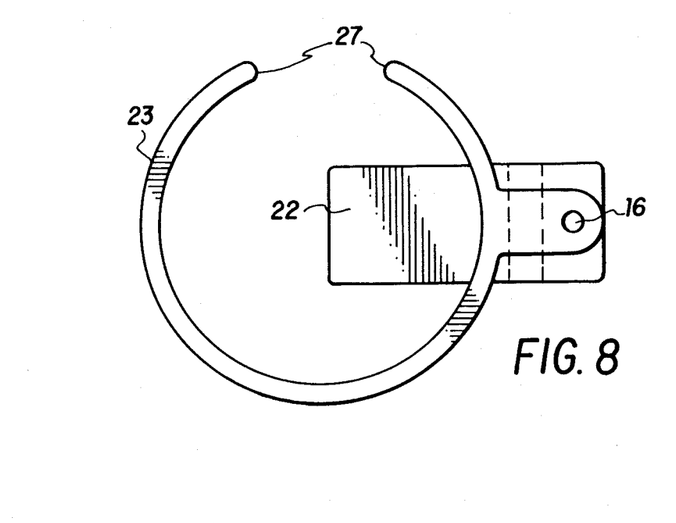
FIG. 8 is a top view showing the support bracket and holder.
Figure 9:
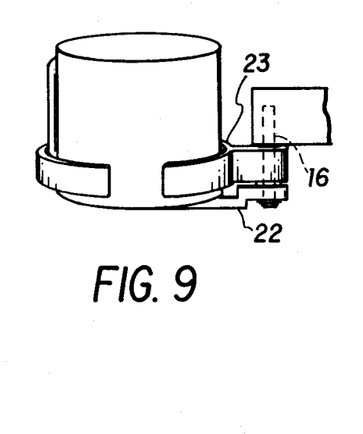
FIG. 9 is a side view showing the support bracket and holder with a cup in place.
Figure 10:
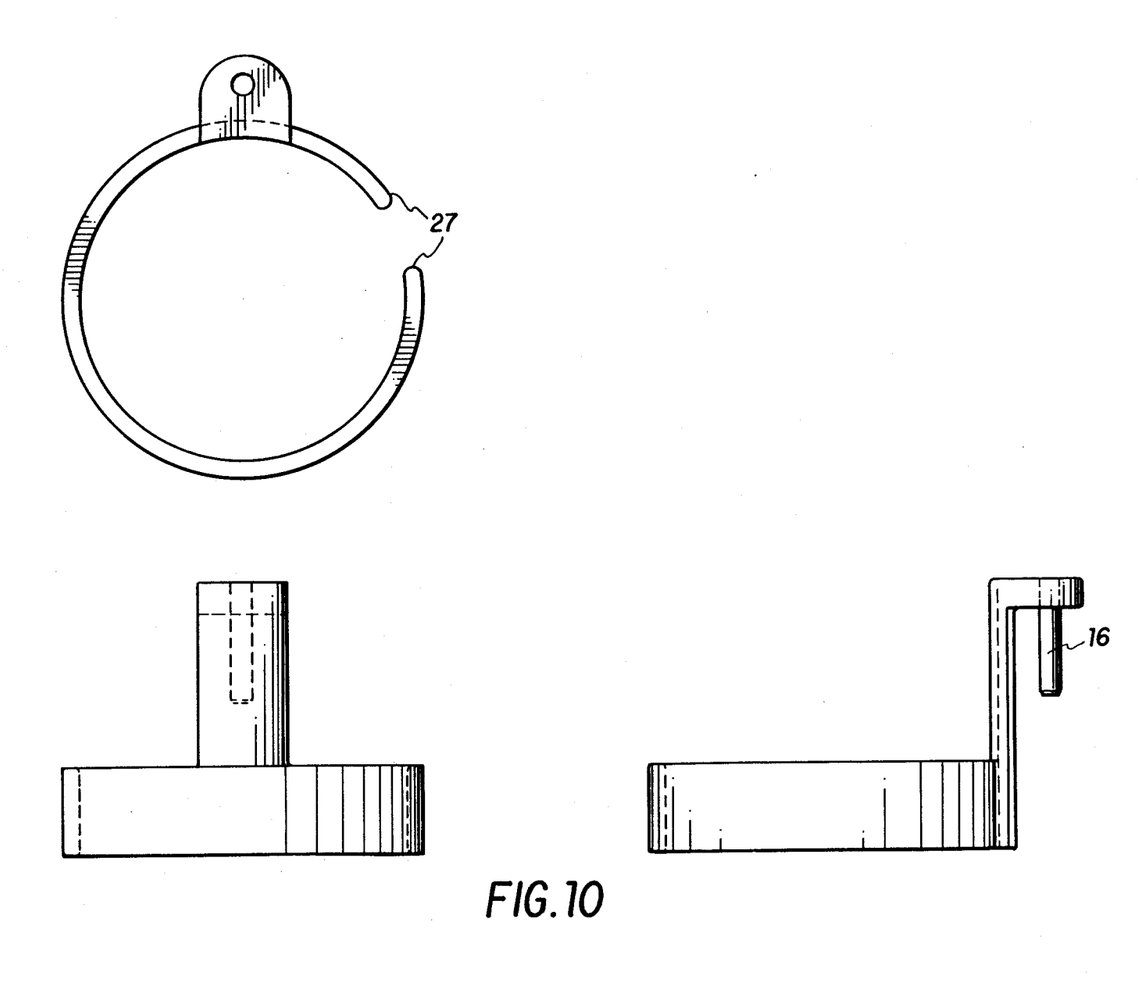
FIG. 10 illustrates further the holder assembly used with the tray of the invention.
Figure 13:
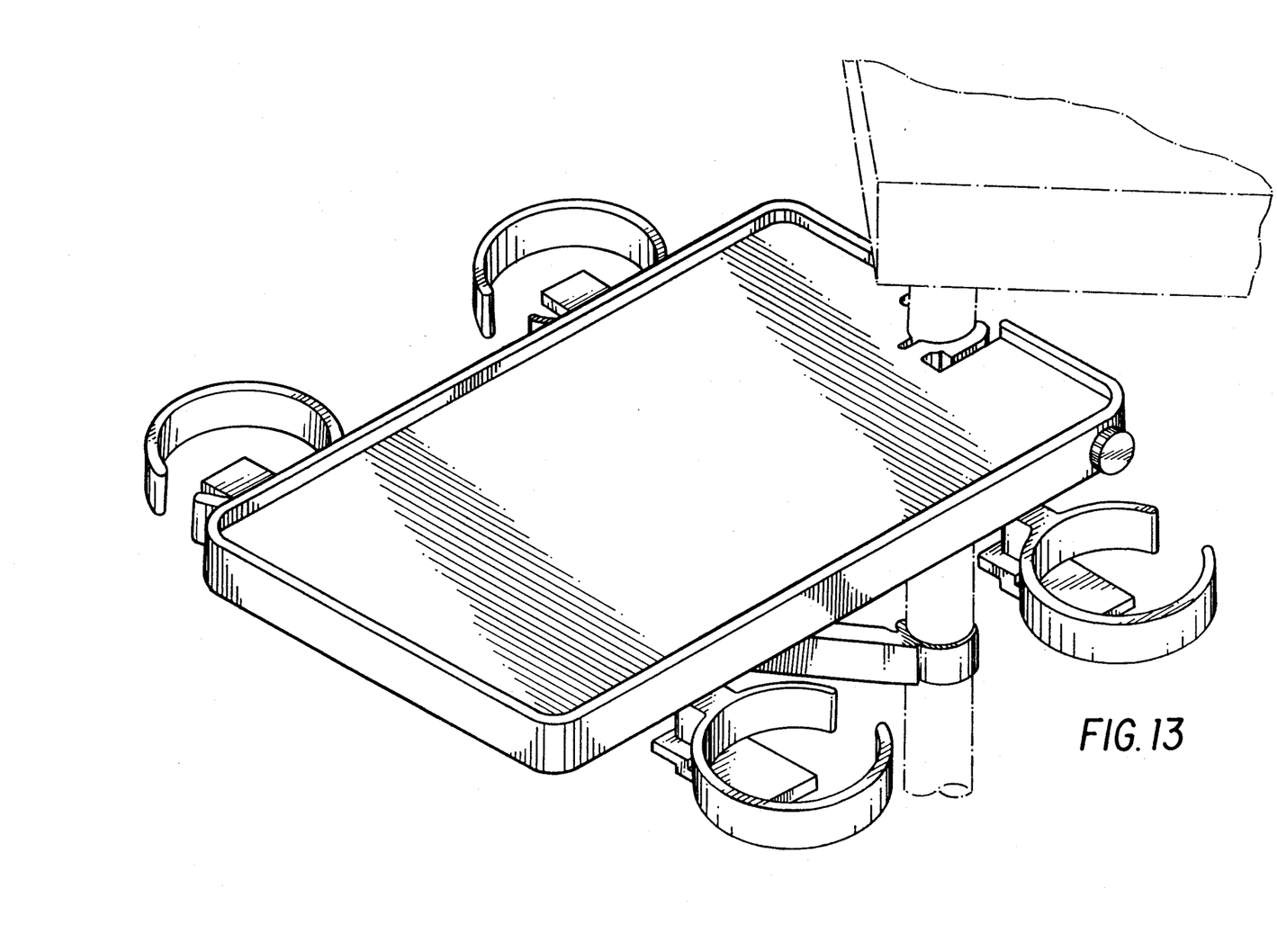
FIG. 13 is a perspective view illustrating attachment of the tray of the invention to the leg of a table.
Figure 14:
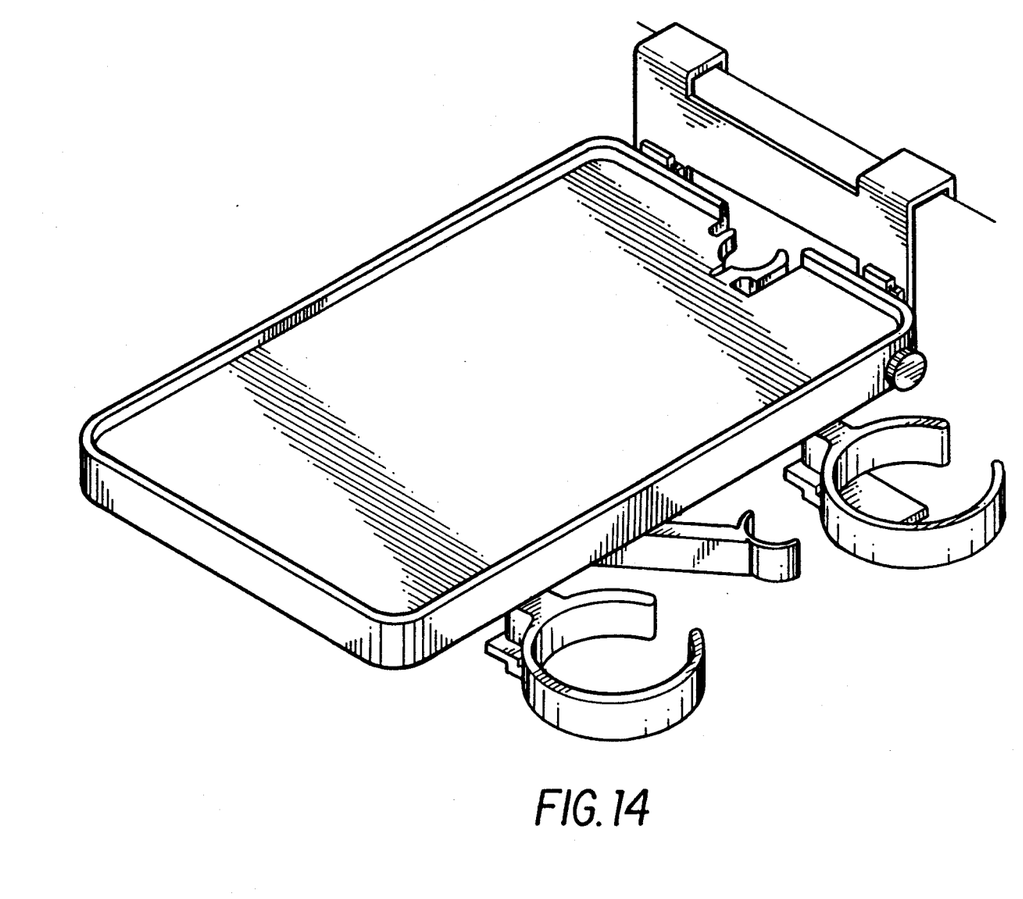
FIG. 14 is a perspective view illustrating attachment of the tray of the invention to the interior window frame of a vehicle.

Referring to FIGS. 4, 5 and 6 of the drawings, the support arm 7 which attaches to the underside of the tray 1 is shown in greater detail. The arm consists of an elongated member 18 having a U-shaped cross section as shown in break-away in FIG. 5. An additional elongated member 8 is constructed to slideably engage the U-shaped channel bracket 18 so that it can be extended or retracted to vary the length of the arm 7. Locking of the respective members 8 and 18 into the desired position is achieved by means of channel 19 provided in member 8 and the wing nut and bolt combination 20 which passes through a hole 9 provided in the member 18 as shown in detail in FIG. 6 of the drawings. A clip 17 or other suitable attachment means is provided on the end of the bracket 7 to attach to a surface or projection to stabilize the tray. As illustrated for example in FIGS. 13 and 14 of the drawings, the bracket 7, which extends from the underside of the horizontal tray surface at an acute angle downward can engage for example the leg of a table as shown in FIG. 13 of the drawings or a projecting surface as shown in FIG. 14 of the drawings.

FIGS. 7, 8, 9 and 10 of the drawings illustrate in greater detail an additional support for holding small items such as cups or glasses which is attached to the downwarding projecting spindles 16. A generally flat horizontal plate 22 is pivotally attached to the spindle 16 by means of a snap ring 26 and washers 24 and 25. A circular bracket 23 also is pivotally attached to the spindle 16 at a point between the underside of the tray surface and the support surface 22. A gap in the circular bracket 23 is provided at 27 to conveniently accommodate the handles of cups. In use, the bracket 23 and support surface 22 simply swing out from underneath the tray to provide a convenient receptacle for cups or other articles as shown for example, in FIGS. 13 and 14 of the drawings.

Figure 11:
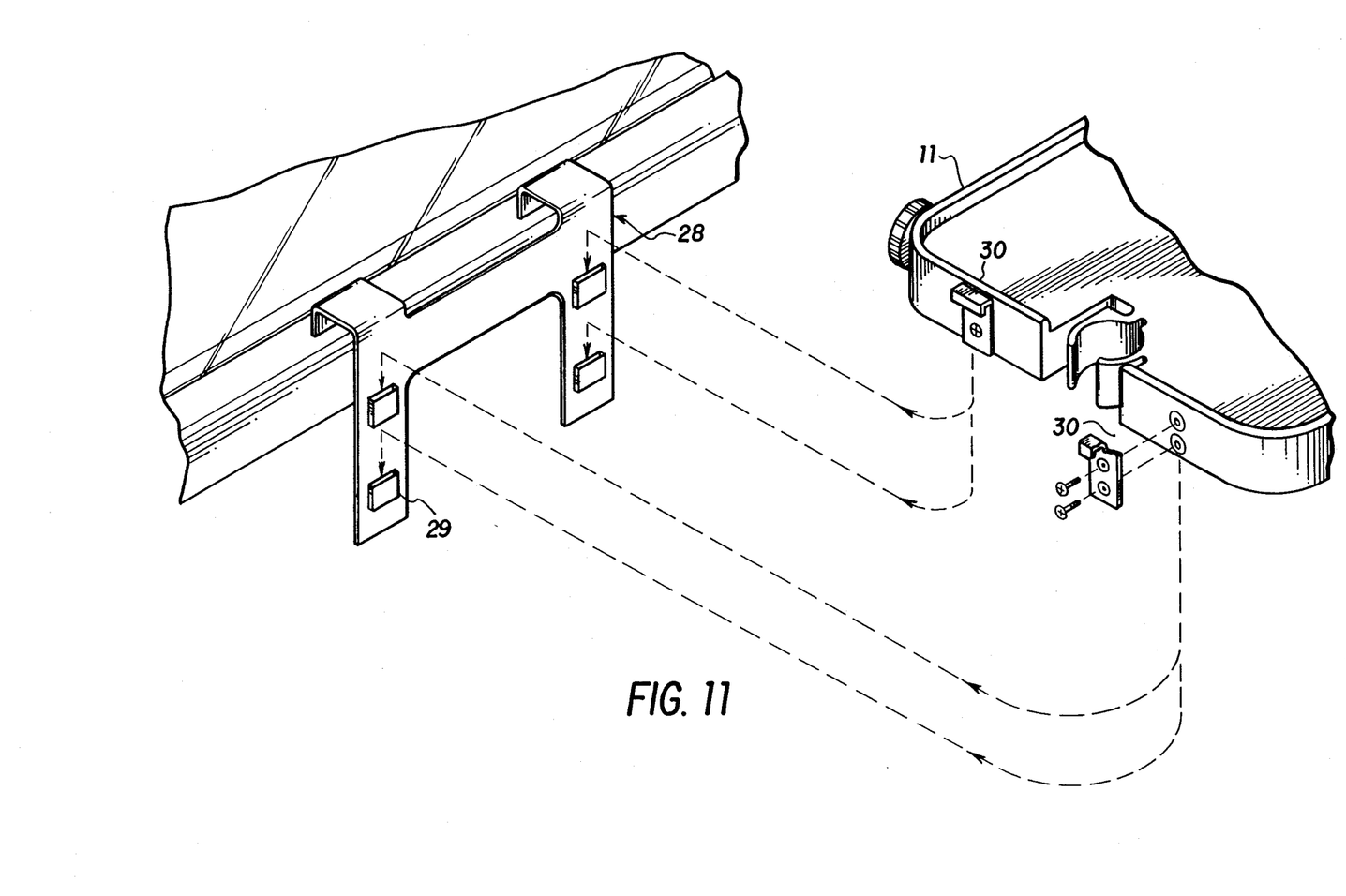
FIG. 11 illustrates the optional bracket which is used to support and hold the tray of the invention.

FIG. 11 of the drawings illustrates an adaptor bracket which is useful in combination with the present invention to permit attachment of the tray horizontally to the inside of a vehicle door. The adaptor bracket 28 has a generally inverted U-shaped configuration so that it can be hung over the interior window sill of a vehicle. Two pairs of slots 29 are provided to accommodate brackets 30 which are attached to the edge 11 of the tray 1. This consruction permits the tray to be mounted in either a high or low position depending on the requirements of the user or the construction of the vehicle.

Figure 12:
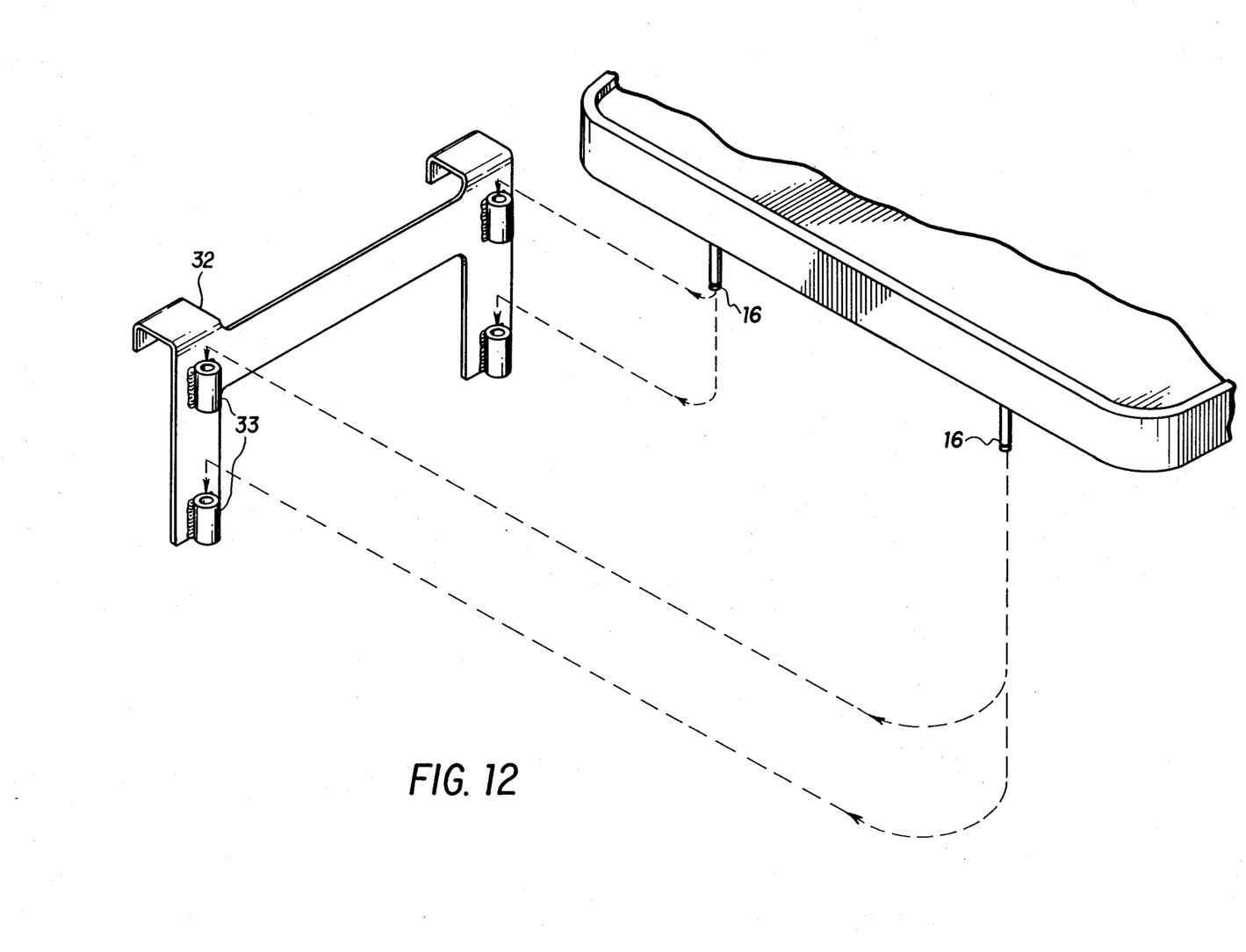
FIG. 12 illustrates an additional embodiment of the window bracket support used in connection with the tray of the invention.

FIG. 12 of the drawings illustrates an additional bracket member similar to that shown in FIG. 11 in which the two pair of slots 29 are replaced with tubular slots 33 to accommodate the downwardly projecting spindles 16 on the tray. Again, two pair of slots are provided to permit positioning of the tray at two different heights.

FIGS. 13 and 14 of the drawings illustrate two ways in which the tray of the invention is conveniently attached to various objects. In FIG. 13, the tray is shown firmly attached to the leg of a table with four article holders extending from underneath the tray as previously described. In FIG. 14 of the drawings, the tray of the invention is attached by means of a bracket to the window frame of an automobile so that it extends outward from the interior door over the lap of a person seated in the vehicle.

It will of course, be appreciated that the tray of the present invention together with its various accessories and optional features can be fabricated from numerous materials although plastics and metals are preferred. The device of the invention has numerous applications such as in vehicles of various types where an easily erected and stored tray surface is useful. The device of the invention also provides an attractive accessory to card tables permitting the person seated at the table to have the food, beverages or other desired items close at hand without cluttering the surface of the table itself. The device of the invention can also be used in connection with wheel chairs, or in fact, in connection with any structure which provides vertical projections or surfaces to which the device can be attached.

What is claimed:

1. A tray for attachment to diverse surfaces and projections comprising a generally flat, planar surface adapted to be horizontally disposed, said surface being provided with at least one clip means formed integrally therewith for attachment to one of said projections, said clip means being a resilient bracket adapted to be tightened onto said projection by applying pressure to one side thereof by means of a screw passing through a portion of said tray to engage said bracket, elongated bracket support means pivotally attached at one end to the underside of said surface at a point remote from said clip means, the other end of said bracket means being provided with means for engaging at an acute angle the same or a different projection or surface as said clip means.

2. The tray of claim 1 wherein said clip means is a generally arcuate shaped bracket.

3. The tray of claim 1 which is further provided with hangers for removably attaching said tray horizontally to a vertical surface.

4. The tray of claim 1 wherein the edge of said tray is provided in at least one location with means for pivotally attaching accessories which are co-planar with the horizontal surface of said tray.

5. The tray of claim 4 wherein said accessories are ash trays or holders for cups and glasses.

6. The tray of claim 4 wherein said accessory attaching means are vertical pins attached to the underside of said tray.

7. The tray of claim 1 wherein reinforcing ribs are provided on the underside of said surface.

* * * * *